United States Patent

[11] 3,630,011

[72] Inventor Frank W. Dunn
 Woodland, Calif.
[21] Appl. No. 54,386
[22] Filed July 13, 1970
[45] Patented Dec. 28, 1971
[73] Assignee Northrup, King & Co.
 Minneapolis, Minn.

[54] DICHONDRA HARVESTER
 20 Claims, 12 Drawing Figs.

[52] U.S. Cl.................................................. 56/126,
 56/328 R, 130/30 J, 36/12.8
[51] Int. Cl. ..................................................... A01d 41/08,
 A01d 45/30
[50] Field of Search........................................... 56/126
 -130, 328 R, 330, 12.8, 12.9; 130/30 J

[56] References Cited
 UNITED STATES PATENTS

| | | | |
|---|---|---|---|
| 1,272,665 | 7/1918 | Isom.............................. | 56/126 |
| 1,334,708 | 3/1920 | Maull............................ | 130/30 J |
| 2,514,945 | 7/1950 | Fortier......................... | 56/328 R |
| 2,637,965 | 5/1953 | Simpson et al................ | 56/12.9 |
| 2,693,072 | 11/1954 | Belzer et al................... | 56/126 |
| 2,781,625 | 2/1957 | Phelps et al.................. | 56/328 R |
| 2,827,749 | 3/1958 | Patten.......................... | 56/128 |

FOREIGN PATENTS

| 518,230 | 3/1953 | Belgium ....................... | 130/30 J |
|---|---|---|---|

*Primary Examiner*—Russell R. Kinsey
*Attorney*—Merchant & Gould

ABSTRACT: The disclosure is directed to a seed harvester for dichondra. The harvester is a wheeled vehicle drawn by a tractor or the like which passes over the dichondra crop and picks up seed bearing plant material by means of a rubber paddled beater. The plant material is carried upwardly to a cyclone separator, which removes and discharges dust and dirt while allowing heavier material to fall into a seed removing cylinder. The resulting seed and residual plant material and dirt are then dropped onto a first shaker screen having two grid configurations, the first of which allows ground up dirt and other fine material to fall through to be discharged. The remaining material, including loosened seeds, moves onto the second grid and drops through onto a differential belt thresher which removes the remaining seed and grinds up residual material into fine particles. This residue is disposed of through the finer grid portion of a second multigrid screen, the seed passing onto a second grid and being exposed to a cleaning fan upon dropping therethrough. The seed undergoes a final screening before discharge into collection boxes.

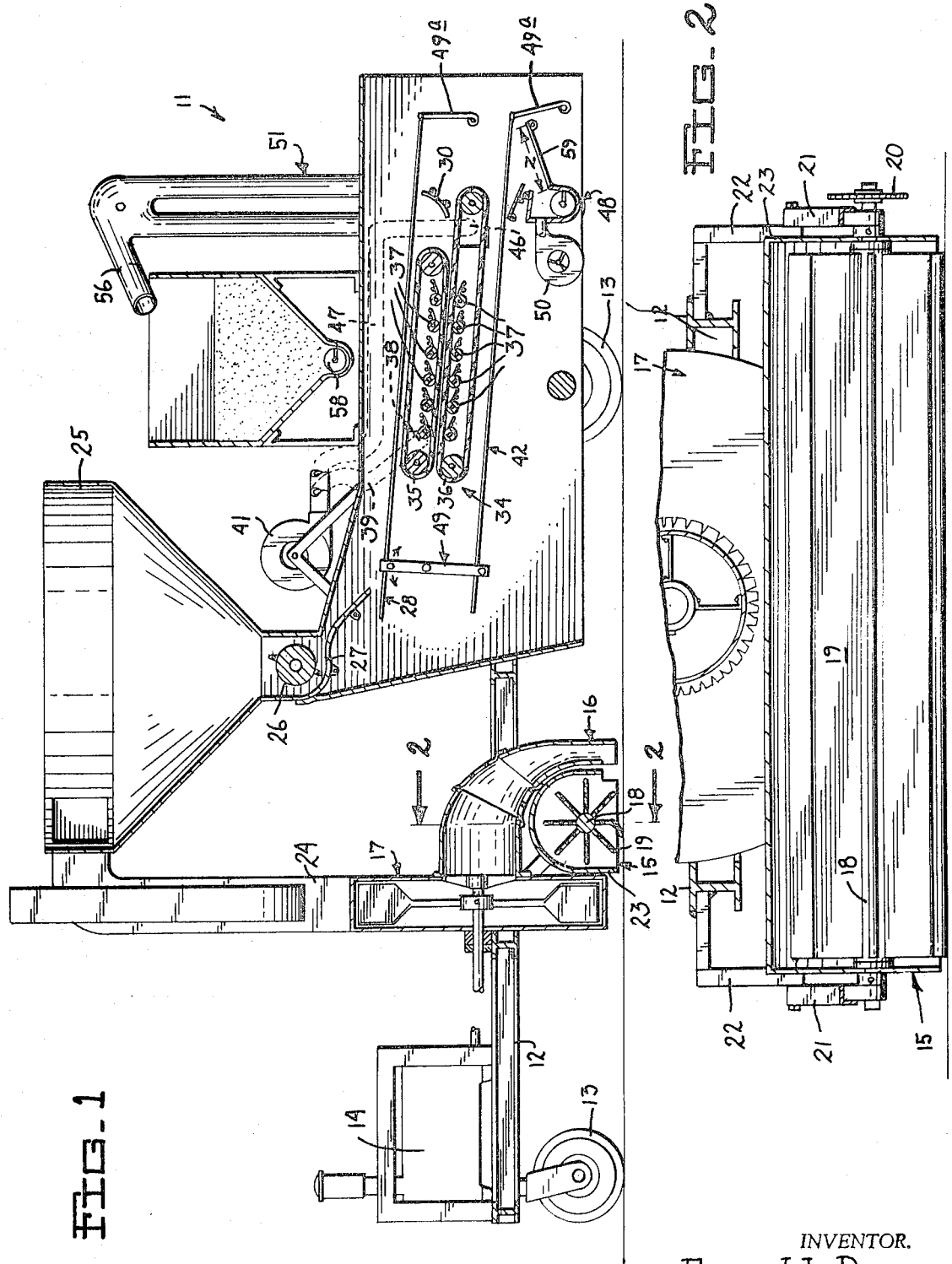

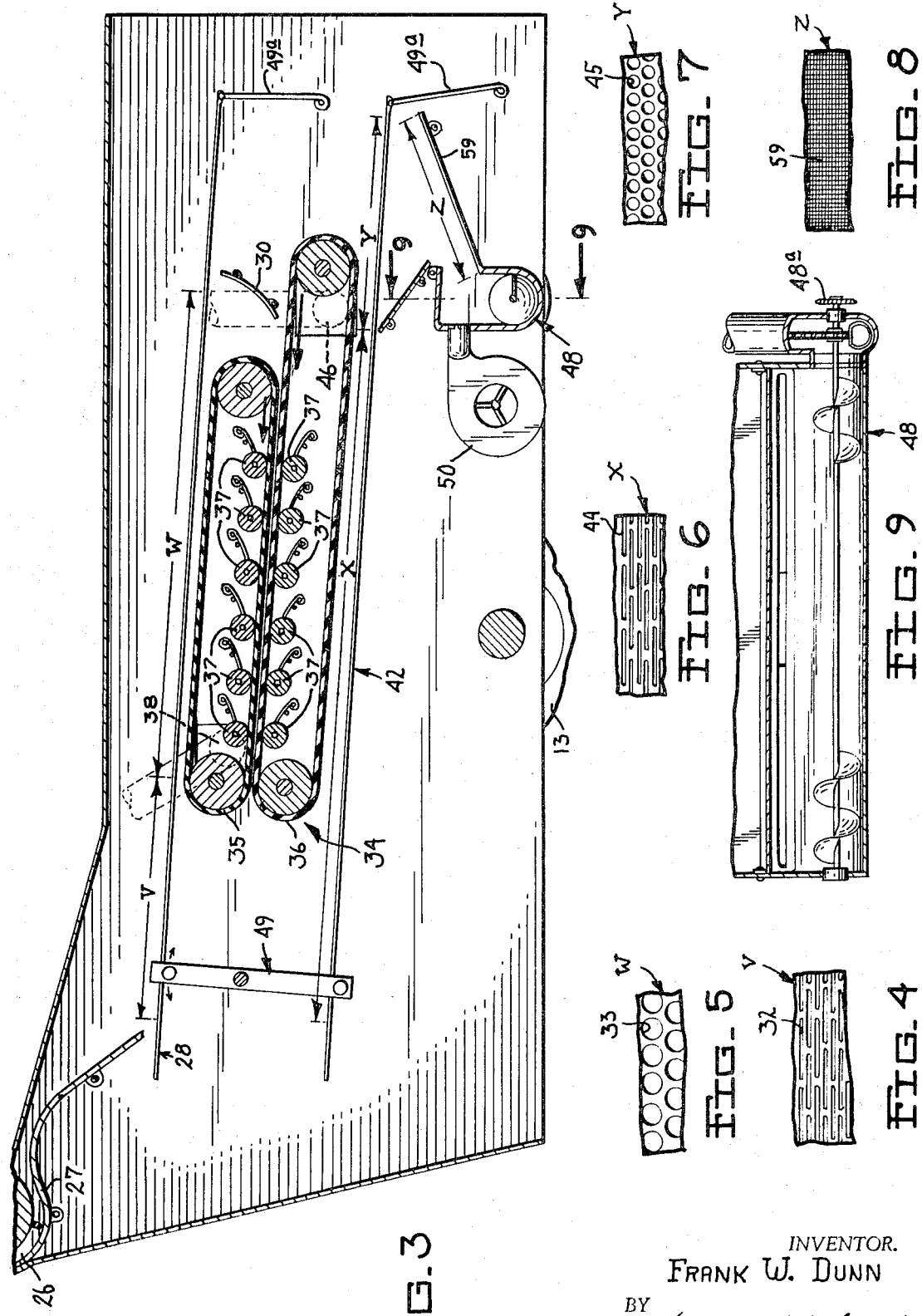

PATENTED DEC 28 1971

INVENTOR.
FRANK W. DUNN
BY
Merchant & Gould
ATTORNEYS

DICHONDRA HARVESTER

The invention relates to seed harvesters and is specifically embodied in a seed harvester for ground covers such as dichondra and clover, which lie close to the ground.

Dichondra is a ground cover having its primary usage as a substitute for grass in warmer climates, particularly the Southern United States. It has slender, flexible stems and small, roundish leaves that give the general appearance of clover. Its growth is generally more outward than upward, resulting in a soft, low-lying ground cover that requires less mowing and trimming than commonly used grasses.

While its low-lying nature makes dichondra attractive as a ground cover, harvesting the seed it bears presents a difficult problem. Commercially available grass seed harvesters are largely unsuccessful because they are not capable of picking up the dichondra seed and seed bearing plant material, and cannot efficiently process the seed and material which is collected.

The prevalent method of harvesting dichondra is through the use of a heavy brush sweeper which picks up approximately 95 percent dirt and 5 percent dichondra seed and seed bearing material. Because of the high percentage of dirt, it has been necessary to transfer all of the swept material to another device which reduces the dirt content to approximately 50 percent. The dirt and seed combination is then put through a cleaning plant to obtain the final seed product. Although this method of harvesting dichondra performs the job, it is at the expense of time, convenience and money.

The invention is thus directed to a seed harvester for dichondra, clover and similar low-lying plant life. It employs a rubber paddled beater to loosen and pick up dichondra seed and seed bearing plant material with as little dirt as possible. The material picked up passes through conventional cyclone separator and threshing apparatus prior to being dropped on a multigrid vibrator screen, which initially disposes of residual material and then drops the remaining seed and other material onto a second threshing apparatus. The second thresher is a unique combination to two conveyor belts running in opposite directions at different speeds, which quickly and efficiently move virtually all seed from the plant material and grind up the residual material into fine particles. These fine particles are disposed of through a second multigrid screen, and the resulting seed is again screened and cleaned before collection.

The improved harvester is capable of harvesting from 4 to 6 acres per day, depending on the crop condition, and recovers approximately 95 percent of the mature seed by going over the same ground twice. The end product contains approximately 50 percent dirt, as compared to 95 percent in the previous method. Consequently, the aforementioned step of reducing dirt content in the previous method has been eliminated, which in turn reduces the production cost of harvesting dichondra by approximately one third.

BRIEF DESCRIPTION OF THE DRAWINGS

FIG. 1 is a side elevation of a seed harvester embodying the inventive principle, part thereof being broken away and shown in section;

FIG. 2 is a sectional view of the harvester taken along the line 2—2 of FIG. 1;

FIG. 3 is an enlarged side elevation of the seed harvester, showing with particularity a first multigrid screen, a differential belt thresher, a second multigrid screen, a final cleaning screen and a collecting auger;

FIG. 4 is a fragmentary top plan of a first grid portion of the first vibrator screen;

FIG. 5 is a fragmentary top plan of a second grid portion of the first vibrator screen;

FIG. 6 is a fragmentary top plan of a first grid portion of the second vibrator screen;

FIG. 7 is a fragmentary top plan of a second grid portion of the second vibrating screen;

FIG. 8 is a fragmentary top plan of the grid of the final cleaning screen;

FIG. 9 is a sectional view of the collecting auger taken along the line 9—9 of FIG. 3;

DESCRIPTION OF THE PREFERRED EMBODIMENT

Figure 10:
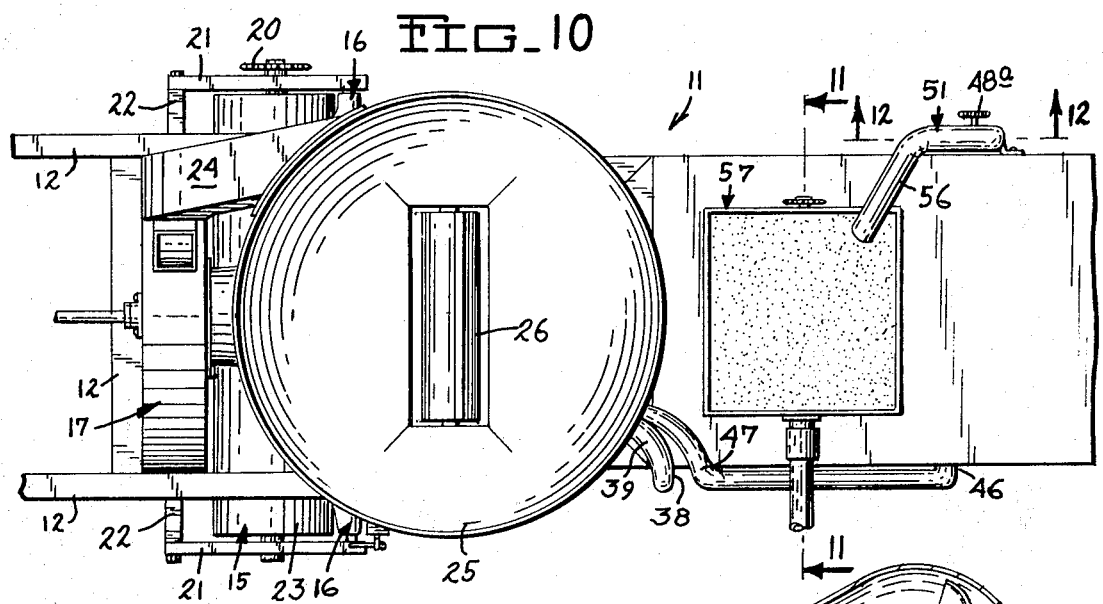
FIG. 10 is a top view of the seed harvester, showing with particularity a cyclone separator and seed collecting box.

Figure 1 discloses a seed harvester represented generally by the numeral 11. Harvester 11 includes a vehicular frame 12 which moves on a plurality of wheels 13 and an engine 14 for powering the harvester apparatus as described below.

A ground engaging beater represented generally by the numeral 15 is carried by frame 12 and serves to loosen and pick up mature seed bearing plant material which is drawn into a suction hood 16 by a fan 17.

Referring additionally to FIG. 2, paddle 15 consists of a hub 18 from which a plurality of resilient paddles project. Hub 18 is rotatably carried by a pair of arms 21, 21 which are pivotally connected to a pair of supports 22, 22 mounted on frame 12. A cover 23 also carried by arms 21, 21 confines the material loosened and picked up by paddles 19. As best seen in FIG. 1, the lower trailing edge of cover 23 and the lower leading edge of suction hood 16 are cut away to receive the material picked up by paddles 19.

The pivotal mounting of beater 15 enable it to follow the contour of the ground as it advances. As viewed in FIG. 1, hub 18 and paddles 19 are rotated in a counterclockwise direction by a sprocket 20 and drive chain (not shown) at approximately 300 r.p.m. Paddles 19 strike the ground with a slapping action to strip vegetative foliage away and loosen seed pods from the plants with a minimum of soil disturbance.

After the loosened material has been drawn into suction hood 16 by fan 17, it passes upwardly through a duct 24 to a cyclone separator 25. Cyclone separator 25 is of a conventional type, causing much of the dust and dirt from plant material to be blown out of the top while allowing the heavier material, including seeds, to be dropped to a threshing cylinder 26. Threshing cylinder 26 operates in association with a concave metal sheet 27 to remove seed from plant material and seed capsules and also to grind dirt into smaller particles for subsequent disposal. Referring additionally to FIG. 3, the material leaving the lower edge of contoured sheet 27 passes onto a first separator screen 28 having a first grid portion extending over the length "v" and a second grid portion extending over the length "w." Screen 28 is carried at the lower end by support arms 49a, and at the upper end by an actuating arm 49. Arm 49 is driven back and forth in an essentially horizontal plane by eccentric operating means, not shown.

FIG. 4 shows the grid configuration of screen 28 over the length "v." It includes a plurality of slots 32 which are sized to permit fine waster material to pass through. In the preferred embodiment, length "v" is 32 inches long and slots 32 are one-half inch long 1/25 inch wide. The remaining material, including seeds, passes onto the length "w" of screen 28 which is 64 inches long, and, as shown in FIG. 5, consists of a plurality of No. 11 round holes 33. This hole size permits seed and also some plant material and dirt to drop through, while the coarser material remains on top of screen 28 and is dropped off the rear edge onto the ground.

The material passing through length "w" of screen 28 falls, with the aid of a contoured guide plate 30, into a second thresher represented generally by the numeral 34. Thresher 34 consists of a first endless belt 35 and a second endless belt 36 disposed therebelow and having a somewhat greater length. The confronting runs of belts 35 and 36 are both driven in the same lineal direction by means not shown, but in the preferred embodiment belt 35 runs from two to five times the speed of belt 36. The resulting effect is to further remove seed from plant material and to grind dirt into smaller particles that will be subsequently disposed of. Continuous engagement of belts 35 and 36 is effected by a plurality of spring biased rollers 37 which keep constant pressure on the material passing between the belts. Because of the relative high speed between belts 35 and 36, thresher 34 is far more effective than conventional threshers in the removal of dirt and plant material from the mature seed.

As material is discharged from thresher 34, it falls onto a second separator screen which, like screen 28, is mounted at the lower end by support arms 49a and at the upper end by the eccentrically driven support arm 49.

Screen 42 also has two grid configurations, the first extending over a length "x" and the second over a length "y." In the preferred embodiment, these lengths are 60 inches and 28 inches, respectively. As seen in FIG. 6, the grid over the length "x" is similar to the first grid portion of screen 28, being formed from a plurality of slotted openings 44. Slots 44 which are also one-half inch long and one twenty-fifth inch wide, permits the finer groundup material to drop through onto the ground. The second grid portion of screen 42 is shown in FIG. 7, and includes a plurality of No. 7 circular openings 45, which are somewhat smaller than the No. 11 openings 33 in the second grid portion of screen 28. Thus, only seed and fine dust drop through this portion of the screen while the coarser material is unable to drop through and is discharged off the rear edge of screen 42 onto the ground.

A fan 41 and discharge pipes 39 and 47 are used to prevent chaff, seed and plant material from collecting on the inside surfaces of belts 35 and 36. Air, discharged from outlets 46 and 38, is directed across the inside surfaces of belts 35 and 36 and all loose material is blown out the side of harvester 11 through an opening not shown.

As material falls through the second grid portion of screen 42, it is exposed to an air stream generated by fan 50. This airstream carries and discharges light chaff from the rear of the machine.

The residual material falls onto a final dust screen 59 having the grid configuration shown in FIG. 8 extending over the length "z." This grid allows dust to fall through and out the back of harvester 11, while the clean seed is dropped into an auger 48 which is shown in detail in FIG. 9.

Figure 12:
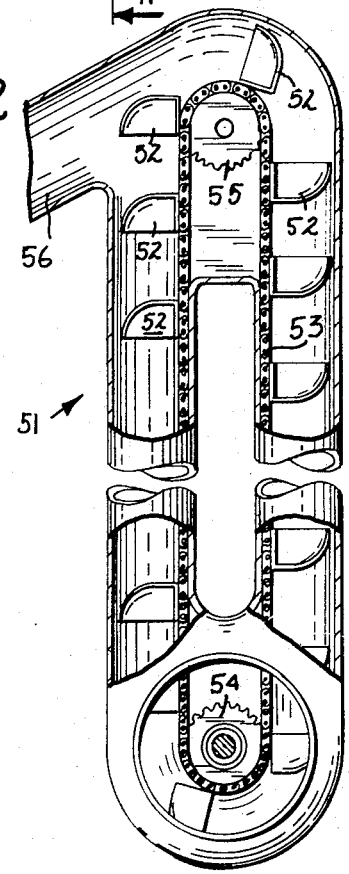
FIG. 12 is a sectional view of a seed elevator taken along the line 12—12 of FIG. 10.

Auger 48 is driven by sprocket 48a and chain (not shown). The discharging end of auger 48 communicates with a seed elevator 51 shown in detail in FIG. 12. Elevator 51 comprises a plurality of baskets 52 carried by an endless chain 53 which extends around sprockets 54 and 55. Sprocket 54 is mounted on the discharge end of auger 48 and provides the driving power for elevator 51.

Figure 11:
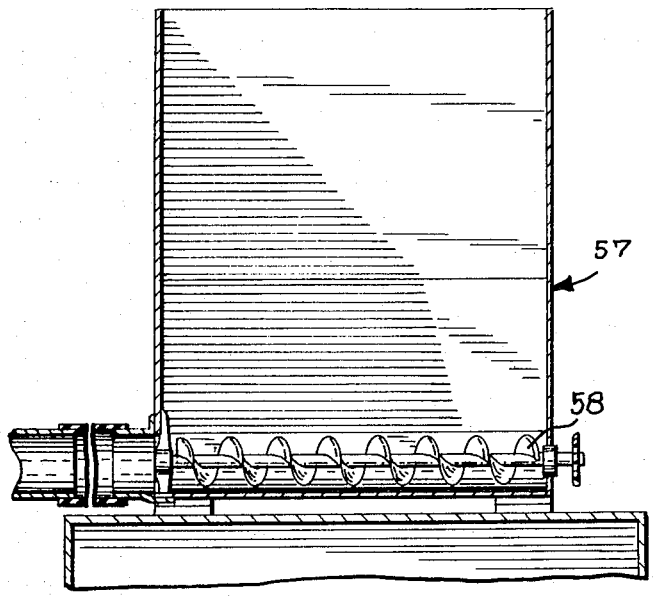
FIG. 11 is a side sectional view of the seed collecting box taken along the line 11—11 of FIG. 10.

Seed leaving elevator 51 is discharged down a chute 56 and into a collecting bin 57. An auger 58 (FIG. 11) is disposed in the bottom of bin 57 for removal of the seed into bulk seed boxes.

All powered harvesting apparatus shown in the several figures are operably connected to engine 14, as by chains and sprockets, V-belts and pulleys or electric generators and motors. These various connecting and powering means have been omitted in the drawings for purposes of clarity.

What is claimed is:

1. Apparatus for harvesting seed from low-lying plants, comprising:
   a wheeled vehicular frame constructed and arranged to support and carry
   picking means for engaging the plants and removing plant material including seeds;
   first separator means communicating with the picking means for separating and discharging lightweight nonseedbearing material;
   means for conveying the plant material from the picking means to the first separator means;
   first threshing means constructed and arranged to receive the seed bearing plant material from the first separator means for removing seed from the plant material and grinding residual material into fine particles;
   second separator means communicating with the first threshing means for separating the seeds and material of like size from said residual fine material and from coarse material of greater size than the seeds;
   second threshing means constructed and arranged to receive said seeds and material of like size from the second separator means for further removing seed from plant material and grinding residual material into fine particles; and
   third separator means communicating with the second threshing means for separating the seeds and material of like size from said residual fine material and from coarse material of greater size than the seeds; and
   collection means communicating with the third separator means for collecting the seeds.

2. The apparatus as defined by claim 1, wherein the picking means comprises a paddle wheel mounted for rotation about an essentially horizontal axis, the paddle wheel having a plurality of resilient, radially disposed paddles constructed and arranged to engage and beat the plant bearing ground.

3. The apparatus as defined by claim 2, wherein the paddle wheel is connected to the vehicular frame by pivot arms to permit vertical, ground-compensating movement of the paddle wheel.

4. The apparatus as defined by claim 1, wherein the conveying means comprises:
   a suction hood having an inlet disposed adjacent the picking means;
   a duct communicating with the suction hood and the first separator means;
   and fan means for drawing picked material into the hood inlet and through the duct to the first separator means.

5. The apparatus as defined by claim 1, wherein the first separator means comprises a cyclone.

6. The apparatus as defined by claim 1, wherein the first threshing means comprises:
   a rotatable threading cylinder mounted for rotation about an essentially horizontal axis;
   and a stationary member having a concave surface disposed in threshing engagement with the threshing cylinder.

7. The apparatus as defined by claim 1, wherein the second separator means comprises:
   a separator screen disposed in an inclined plane and including first and second grid portions;
   the first grid portion disposed above the second grid portion and arranged to receive material from the first threshing means;
   the first portion comprising a plurality of openings sized to permit only residual fine materials to pass therethrough;
   and the second grid portion comprising a plurality of openings sized to permit only said seeds and material of like and smaller size to pass therethrough; and means for shaking the separator screen to facilitate the passage of material therethrough.

8. The apparatus as defined by claim 7, wherein the lowest edge of the separator screen is positioned to permit said coarse material to drop onto the ground.

9. The apparatus as defined by claim 1, wherein the second threshing means comprising:
   a first conveyor belt having a conveying surface constructed and arranged to receive said seeds and material of like size from the second separator means, the conveying surface moving in a first direction at a first speed;
   and a second conveyor belt having a conveying surface engageable with the conveying surface of the first conveyor belt and moving in said first direction at a second speed.

10. The apparatus as defined by claim 9, wherein the conveying surface of the first conveyor belt is longer than that of the second conveyor belt and disposed therebelow.

11. The apparatus as defined by claim 9, and further comprising means for biasing the conveying surfaces of the first and second conveyor belts into continuous engagement.

12. The apparatus as defined by claim 9, wherein said second speed is from 2 to 5 times said first speed.

13. The apparatus as defined by claim 1, wherein the third separator means comprises:
- a second separator screen disposed in an inclined plane and including first and second grid portions;
- the first grid portion disposed above the second grid portion and arranged to receive material from the second threshing means;
- the first grid portion comprising a plurality of openings sized to permit only said residual fine material passed therethrough;
- the second grid portion comprising a plurality of openings sized to permit only said seed and material of like and smaller size to pass therethrough; and means for shaking the second separator screen to facilitate passage of material therethrough.

14. The apparatus as defined by claim 13, wherein the lowest edge of the second separator screen is positioned to permit said coarse material to drop onto the ground.

15. The apparatus as defined by claim 1, and further comprising fourth separator means disposed between the third separator means and the collection means, the fourth separator means arranged to receive material from a third separator means and constructed to separate said seed from residual material of lesser size, the fourth separator means arranged to discharge said seed into the collection means.

16. The apparatus as defined by claim 15, wherein the fourth separator means comprises a separator screen disposed in an inclined plane, the separator screen having a grid portion comprising a plurality of openings sized to permit said residual material of lesser size than said seed to pass therethrough.

17. The apparatus as defined by claim 9, wherein the first and second conveyor belts are endless, and further comprising blower means for producing an airflow across the inner surfaces of the endless belts to prevent access of accumulation of material thereon.

18. The apparatus as defined by claim 7, wherein the separator screen is slidably mounted on the vehicular frame, and the shaking means comprises a reciprocally driven actuating arm operably connected to said screen.

19. The apparatus as defined by claim 13, wherein the separator screen is slidably mounted on the vehicular frame, and the shaking means comprises a reciprocally driven actuating arm operably connected to said screen.

20. The apparatus as defined by claim 15, and further comprising blower means for producing an airflow through the material passing between the third and fourth separator means.

* * * * *